United States Patent
Iguchi et al.

(10) Patent No.: US 10,964,976 B2
(45) Date of Patent: Mar. 30, 2021

(54) ELECTROLYTE SOLUTION AND LITHIUM-ION BATTERY

(71) Applicant: TOYOTA JIDOSHA KABUSHIKI KAISHA, Toyota (JP)

(72) Inventors: Hiroki Iguchi, Nagoya (JP); Hideki Sano, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 16/272,356

(22) Filed: Feb. 11, 2019

(65) Prior Publication Data

US 2019/0260081 A1  Aug. 22, 2019

(30) Foreign Application Priority Data

Feb. 22, 2018  (JP) .............................. JP2018-029618

(51) Int. Cl.
*H01M 10/0569* (2010.01)
*H01M 10/0568* (2010.01)
*H01M 10/0525* (2010.01)

(52) U.S. Cl.
CPC ... *H01M 10/0569* (2013.01); *H01M 10/0525* (2013.01); *H01M 10/0568* (2013.01); *H01M 2300/0028* (2013.01); *H01M 2300/0051* (2013.01)

(58) Field of Classification Search
CPC ................................................ H01M 10/0569
See application file for complete search history.

(56) References Cited

U.S. PATENT DOCUMENTS

2015/0364792 A1  12/2015 Watahiki et al.

FOREIGN PATENT DOCUMENTS

JP   04-162370 A   6/1992
WO  2014/115784 A1  7/2014

*Primary Examiner* — Jonathan Crepeau
(74) *Attorney, Agent, or Firm* — Sughrue Mion, PLLC

(57) ABSTRACT

An electrolyte solution for a lithium-ion battery is provided. The electrolyte solution contains at least a solvent and a lithium salt. The solvent contains at least methoxyacetone.

7 Claims, 1 Drawing Sheet

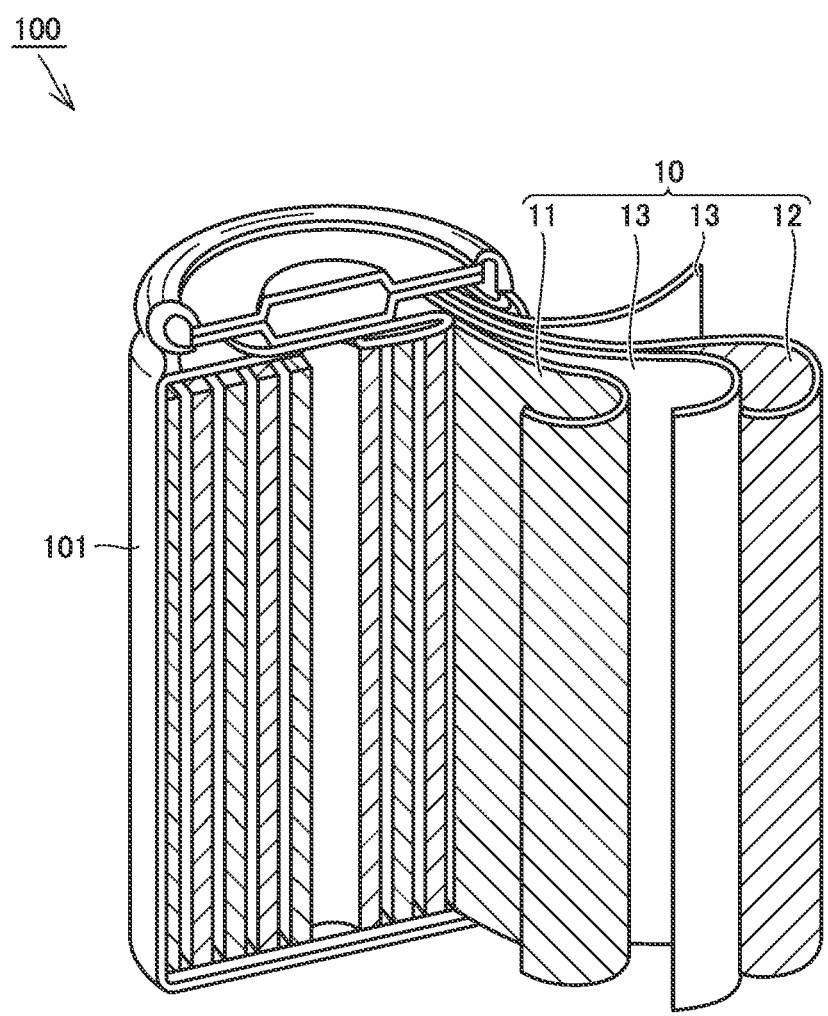

ELECTROLYTE SOLUTION AND LITHIUM-ION BATTERY

This nonprovisional application is based on Japanese Patent Application No. 2018-029618 filed on Feb. 22, 2018 with the Japan Patent Office, the entire contents of which are hereby incorporated by reference.

BACKGROUND

Field

The present disclosure relates to an electrolyte solution and a lithium-ion battery.

Description of the Background Art

Japanese Patent Laying-Open No. 04-162370 discloses an electrolyte solution that contains, as solvent, a mixed solvent of a cyclic carbonate and a chain carbonate.

SUMMARY

An electrolyte solution containing a lithium (Li) salt and a solvent has a conductivity that is considered to vary depending on the degree of dissociation of the Li salt and the viscosity of the solvent. More specifically, it is considered that as the degree of dissociation of the Li salt increases and the viscosity of the solvent decreases, the conductivity of the electrolyte solution increases.

Conventionally, cyclic carbonate and chain carbonate are widely used as solvent for an electrolyte solution for a lithium-ion battery. Each of cyclic carbonate and chain carbonate has merits and demerits in terms of conductivity. It is considered that cyclic carbonate has a high dissociation-promoting ability and therefore promotes dissociation of Li salts. It is also considered that cyclic carbonate is highly viscous and therefore reduces the mobility of Li ions. As for chain carbonate, it is considered that its viscosity is low and therefore Li ions can easily move in it. It is also considered that chain carbonate has a poor dissociation-promoting ability and therefore does not promote dissociation of Li salts. For offsetting the demerits of both cyclic carbonate and chain carbonate while taking advantage of the merits of these carbonates, a mixture of these carbonates is conventionally used.

It is known that the conductivity of a mixed solvent of cyclic carbonate and chain carbonate reaches its maximum level when the volume ratio of the cyclic carbonate is about 30 vol %. Thus, the composition of a mixed solvent of cyclic carbonate and chain carbonate is already optimized, and therefore no more improvement in conductivity may be expected.

An object of the present disclosure is to provide a novel electrolyte solution for a lithium-ion battery.

In the following, the technical structure and the effects according to the present disclosure are described. It should be noted that part of an action mechanism according to the present disclosure is based on presumption. Therefore, the scope of claims should not be limited by whether or not the action mechanism is correct.

[1] The electrolyte solution according to the present disclosure is an electrolyte solution for a lithium-ion battery. The electrolyte solution contains at least a solvent and a lithium salt. The solvent contains at least methoxyacetone.

Methoxyacetone is not conventionally known for use as solvent for an electrolyte solution for a lithium-ion battery. In other words, the electrolyte solution according to the present disclosure is a novel electrolyte solution for a lithium-ion battery. It is expected that the present disclosure expands material options and therefore expands technological variations.

When the solvent contains methoxyacetone, improvement in conductivity is expected to be obtained. The detailed mechanism of this improvement in conductivity is unclear at this point, but the following mechanism can be envisaged: methoxyacetone itself has dissociation-promoting ability and viscosity in an excellent balance.

[2] The solvent may contain methoxyacetone in an amount not lower than 50 vol %.

[3] The solvent may contain methoxyacetone in an amount not lower than 70 vol %.

[4] The solvent may consist of methoxyacetone.

The higher the volume ratio of methoxyacetone is, the greater the potential improvement in conductivity is.

[5] The concentration of the lithium salt may be not lower than 0.7 mol/L and not higher than 1.5 mol/L. When the concentration of the lithium salt is within this range, improvement in conductivity is expected to be obtained.

[6] The concentration of the lithium salt may be not lower than 1.1 mol/L and not higher than 1.5 mol/L. When the concentration of the lithium salt is within this range, improvement in conductivity is expected to be obtained.

[7] A lithium-ion battery according to the present disclosure includes at least the electrolyte solution according to any one of [1] to [6] above. The lithium-ion battery according to the present disclosure is expected to have a high power.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a schematic view illustrating the structure of the lithium-ion battery according to the present embodiment.

DESCRIPTION OF THE PREFERRED EMBODIMENTS

In the following, embodiments according to the present disclosure (herein called "present embodiment") are described. The scope of claims is not limited to the description below.

<Electrolyte Solution>

An electrolyte solution according to the present embodiment is an electrolyte solution for a lithium-ion battery. The lithium-ion battery is described below in detail. The electrolyte solution contains at least a solvent and a lithium salt. It is expected that the electrolyte solution has a high conductivity.

The electrolyte solution may have a conductivity not lower than 11.2 mS/cm, for example. The electrolyte solution may have a conductivity not lower than 11.3 mS/cm, for example. The electrolyte solution may have a conductivity not lower than 14.6 mS/cm, for example. The electrolyte solution may have a conductivity not lower than 15.2 mS/cm, for example. The electrolyte solution may have a conductivity not lower than 16.0 mS/cm, for example. The electrolyte solution may have a conductivity not lower than 16.8 mS/cm, for example. The electrolyte solution may have a conductivity not higher than 17.5 mS/cm, for example. The conductivity of the electrolyte solution is measured with a conductivity meter. The conductivity meter may also be called electrical conductivity meter or electric conductivity meter, for example. The conductivity is measured at 25° C. Conductivity measurement is carried out at least three times. The arithmetic mean of these at least three measurements is used.

<<Solvent>>

The solvent contains at least methoxyacetone. The solvent may contain methoxyacetone in an amount not lower than 20 vol % and not higher than 100 vol % (not lower than 20 volume % and not higher than 100 volume %), for example. The composition of the solvent may be identified by a conventionally known method. The composition of the solvent may be identified by nuclear magnetic resonance (NMR) spectrometry or gas chromatography-mass spectroscopy (GC-MS), for example.

The solvent may contain methoxyacetone in an amount not lower than 50 vol %. The solvent may contain methoxyacetone in an amount not lower than 70 vol %. The solvent may consist of methoxyacetone. The higher the volume ratio of methoxyacetone is, the greater the potential improvement in conductivity is.

As long as the solvent contains methoxyacetone, the solvent may further contain other solvent components. When the solvent contains other solvent components, these other solvent components make up the remainder of the solvent. Examples of these other solvent components include a cyclic carbonate, a chain carbonate, a lactone, a cyclic ether, a chain ether, and a carboxylic acid ester. The solvent may contain only one type of these other solvent components. The solvent may contain two or more types of these other solvent components.

The cyclic carbonate may be ethylene carbonate (EC), propylene carbonate (PC), butylene carbonate (BC), and/or fluoroethylene carbonate (FEC), for example. The chain carbonate may be dimethyl carbonate (DMC), ethyl methyl carbonate (EMC), and/or diethyl carbonate (DEC), for example.

The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

For example, the solvent may contain methoxyacetone in an amount not lower than 20 vol % and lower than 100 vol % with the remainder being made up of the cyclic carbonate (such as EC). For example, the solvent may contain methoxyacetone in an amount not lower than 50 vol % and lower than 100 vol % with the remainder being made up of the cyclic carbonate. For example, the solvent may contain methoxyacetone in an amount not lower than 70 vol % and lower than 100 vol % with the remainder being made up of the cyclic carbonate.

For example, the solvent may contain methoxyacetone in an amount not lower than 20 vol % and lower than 100 vol % with the remainder being made up of the chain carbonate (such as DMC). For example, the solvent may contain methoxyacetone in an amount not lower than 50 vol % and lower than 100 vol % with the remainder being made up of the chain carbonate. For example, the solvent may contain methoxyacetone in an amount not lower than 70 vol % and lower than 100 vol % with the remainder being made up of the chain carbonate.

For example, the solvent may contain methoxyacetone in an amount not lower than 20 vol % and lower than 100 vol % with the remainder being made up of the cyclic carbonate (such as EC) and the chain carbonate (such as DMC). For example, the solvent may contain methoxyacetone in an amount not lower than 50 vol % and lower than 100 vol % with the remainder being made up of the cyclic carbonate and the chain carbonate. For example, the solvent may contain methoxyacetone in an amount not lower than 70 vol % and lower than 100 vol % with the remainder being made up of the cyclic carbonate and the chain carbonate. The cyclic carbonate and the chain carbonate making up the remainder may satisfy the following relationship: (cyclic carbonate):(chain carbonate)=1:9 to 9:1 (volume ratio), for example. The cyclic carbonate and the chain carbonate may satisfy the following relationship: (cyclic carbonate):(chain carbonate)=2:8 to 8:2 (volume ratio), for example. The cyclic carbonate and the chain carbonate may satisfy the following relationship: (cyclic carbonate):(chain carbonate)=3:7 to 7:3 (volume ratio), for example.

<<Lithium Salt>>

The Li salt is dissolved in the solvent. The concentration of the Li salt may be not lower than 0.7 mol/L and not higher than 2 mol/L (not lower than 0.7 M and not higher than 2 M), for example. The concentration of the Li salt may be measured by a conventionally known method. The concentration of the Li salt may be measured by NMR spectrometry, for example. The concentration of the Li salt may be not lower than 0.7 mol/L and not higher than 1.5 mol/L. When the concentration is within these ranges, improvement in conductivity is expected to be obtained. The concentration of the Li salt may be not lower than 1.1 mol/L and not higher than 1.5 mol/L. When the concentration is within this range, improvement in conductivity is expected to be obtained.

The type of the Li salt may be identified by a conventionally known method. The type of the Li salt may be identified by NMR spectrometry, for example. The Li salt may be $LiPF_6$, $LiBF_4$, $LiClO_4$, $LiAsF_6$, $LiSbF_6$, $LiCF_3SO_3$, $LiC_4F_9SO_3$, $Li[N(FSO_2)_2]$, $Li[N(CF_3SO_2)_2]$, and/or $Li[C(CF_3SO_2)_3]$, for example. The electrolyte solution may contain only one type of the Li salt. The electrolyte solution may contain two or more types of the Li salt. When the electrolyte solution contains two or more types of the Li salt, the concentration of the Li salt refers to the total concentration of all the Li salts contained.

<<Additives>>

As long as the electrolyte solution according to the present embodiment contains the solvent and the Li salt, the electrolyte solution may further contain various additives. The concentration of the additives may be not lower than 0.005 mol/L and not higher than 0.5 mol/L, for example. Examples of the additives include a solid electrolyte interface (SEI) film-forming agent, a gas generation agent (also called anti-overcharging additive), and a flame retardant. The electrolyte solution may contain only one type of the additives. The electrolyte solution may contain two or more types of the additives. When the electrolyte solution contains two or more types of the additives, the concentration of the additives refers to the total concentration of all the additives contained.

The SEI-film-forming agent may be vinylene carbonate (VC), vinylethylene carbonate (VEC), $LiB(C_2O_4)_2$, $LiBF_2(C_2O_4)$, $LiPF_2(C_2O_4)_2$, propane sultone (PS), and/or ethylene sulfite (ES), for example. The gas generation agent may be cyclohexylbenzene (CHB) and/or biphenyl (BP), for example. The flame retardant may be a phosphoric acid ester and/or a phosphazene compound, for example.

<Lithium-Ion Battery>

The lithium-ion battery according to the present embodiment may be a secondary battery. The lithium-ion battery may be a primary battery. Hereinafter, a lithium-ion battery is also simply referred to as "battery".

FIG. 1 is a schematic view illustrating the structure of the lithium-ion battery according to the present embodiment.

A battery 100 includes a casing 101. Casing 101 is cylindrical. Alternatively, casing 101 may be prismatic. Casing 101 may be made of stainless steel and/or aluminum (Al) alloy, for example. Casing 101 may be a pouch made of an aluminum-laminated film, for example. Casing 101 may be further equipped with a gas-discharge valve and/or a current interrupt device (CID), for example.

Casing 101 accommodates an electrode array 10 and an electrolyte solution (not shown). The electrolyte solution is the electrolyte solution according to the present embodiment. In other words, battery 100 includes at least the electrolyte solution according to the present embodiment. The electrolyte solution according to the present embodiment is described above in detail. Battery 100 is expected to have a high power. It is considered that this potential high power results from the potential high conductivity of the electrolyte solution according to the present embodiment.

Electrode array 10 includes a positive electrode 11, a negative electrode 12, and a separator 13. Electrode array 10 is a wound-type one. More specifically, electrode array 10 may be formed by stacking positive electrode 11, separator 13, negative electrode 12, and separator 13 in this order and then winding them in a spiral fashion.

Electrode array 10 may be a stack-type one. More specifically, electrode array 10 may be formed by alternately stacking one positive electrode 11 and one negative electrode 12 and then repeating this alternate stacking process more than once. In each space between positive electrode 11 and negative electrode 12, separator 13 is interposed.

<<Positive Electrode>>

Positive electrode 11 may be in sheet form, for example. Positive electrode 11 includes at least a positive electrode active material. Positive electrode 11 may further include a positive electrode current collector, a conductive material, and a binder, for example. For example, a positive electrode composite material containing the positive electrode active material, the conductive material, and the binder may be applied to a surface of the positive electrode current collector to produce positive electrode 11. The positive electrode current collector may be made of Al foil, for example. The positive electrode current collector may have a thickness not smaller than 5 μm and not greater than 50 μm, for example.

The positive electrode active material is typically a group of particles. The positive electrode active material may have a d50 not lower than 1 μm and not higher than 30 μm, for example. The d50 refers to the particle size in particle size distribution obtained by laser diffraction and scattering at which the cumulative particle volume (accumulated from the side of small sizes) reaches 50% of the total particle volume.

The positive electrode active material occludes and releases Li ions. The positive electrode active material is not particularly limited. The positive electrode active material may be lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$), lithium nickel cobalt aluminate (such as $LiNi_{0.82}Co_{0.15}Al_{0.03}O_2$), and/or lithium iron phosphate ($LiFePO_4$), for example. One type of the positive electrode active material may be used alone. Two or more types of the positive electrode active material may be used in combination.

The conductive material is electronically conductive. The conductive material is not particularly limited. The conductive material may be carbon black (such as acetylene black) and/or carbon short fibers, for example. The content of the conductive material may be, for example, not lower than 0.1 part by mass and not higher than 10 parts by mass relative to 100 parts by mass of the positive electrode active material.

The binder binds particles of the positive electrode active material to each other. The binder binds the positive electrode active material and the positive electrode current collector to each other. The binder is not particularly limited. The binder may be polyvinylidene difluoride (PVdF), for example. The content of the binder may be, for example, not lower than 0.1 part by mass and not higher than 10 parts by mass relative to 100 parts by mass of the positive electrode active material.

<<Negative Electrode>>

Negative electrode 12 may be in sheet form, for example. Negative electrode 12 includes at least a negative electrode active material. Negative electrode 12 may further include a negative electrode current collector and a binder, for example. For example, a negative electrode composite material containing the negative electrode active material and the binder may be applied to a surface of the negative electrode current collector to produce negative electrode 12. The negative electrode current collector may be made of copper (Cu) foil, for example. The negative electrode current collector may have a thickness not smaller than 5 μm and not greater than 50 μm, for example.

The negative electrode active material is typically a group of particles. The negative electrode active material may have a d50 not lower than 1 μm and not higher than 30 μm, for example. The negative electrode active material occludes and releases Li ions. The negative electrode active material is not particularly limited. The negative electrode active material may be graphite, soft carbon, hard carbon, silicon, silicon oxide, silicon-based alloy, tin, tin oxide, tin-based alloy, and/or lithium titanate oxide, for example. One type of the negative electrode active material may be used alone. Two or more types of the negative electrode active material may be used in combination.

The binder binds particles of the negative electrode active material to each other. The binder binds the negative electrode active material and the negative electrode current collector to each other. The binder is not particularly limited. The binder may be carboxymethylcellulose (CMC) and/or styrene-butadiene rubber (SBR), for example. The content of the binder may be, for example, not lower than 0.1 part by mass and not higher than 10 parts by mass relative to 100 parts by mass of the negative electrode active material.

<<Separator>>

Separator 13 is insulating. Separator 13 is interposed between positive electrode 11 and negative electrode 12. Positive electrode 11 and negative electrode 12 are separated from each other by separator 13. Separator 13 is a porous film. Separator 13 allows the electrolyte solution to pass therethrough. Separator 13 may have a thickness not smaller than 10 μm and not greater than 30 μm, for example. Separator 13 may be a polyolefin porous film, for example.

Separator 13 may have a monolayer structure. Separator 13 may consist of a polyethylene (PE) porous film, for example. Separator 13 may have a multilayer structure. Separator 13 may be formed by stacking a polypropylene (PP) porous film, a PE porous film, and a PP porous film in this order, for example. Separator 13 may have a heat-resistant film on a surface thereof. The heat-resistant film contains a heat-resistant material. The heat-resistant material may be boehmite, silica, and/or titania, for example.

EXAMPLES

In the following, examples according to the present disclosure are described. The scope of claims is not limited to the description below.

<Preparation of Electrolyte Solution and Measurement of Conductivity>

Each electrolyte solution specified in Table 1 below was prepared. The conductivity of the electrolyte solution was measured. The conductivity measurement of the electrolyte solution was conducted at 25° C.

TABLE 1

List of Examples and Comparative Examples

| | Electrolyte solution | | Conductivity |
|---|---|---|---|
| | Solvent | Li salt | [mS/cm] |
| Comp. Ex. 1 | EC (100 vol %) | $LiPF_6$ (1.1 mol/L) | 8.0 |
| Comp. Ex. 2 | DMC (100 vol %) | $LiPF_6$ (1.1 mol/L) | 7.5 |
| Comp. Ex. 3 | DMC (70 vol %) + EC (30 vol %) | $LiPF_6$ (1.1 mol/L) | 12.3 |
| Comp. Ex. 4 | Acetylacetone (100 vol %) | $LiPF_6$ (1.1 mol/L) | 12.2 |
| Comp. Ex. 5 | Acetylacetone (70 vol %) + EC (30 vol %) | $LiPF_6$ (1.1 mol/L) | 12.2 |
| Comp. Ex. 6 | Methyl methoxyacetate (100 vol %) | $LiPF_6$ (1.1 mol/L) | 10.9 |
| Comp. Ex. 7 | Methyl methoxyacetate (70 vol %) + EC (30 vol %) | $LiPF_6$ (1.1 mol/L) | 12.0 |
| Ex. 1 | Methoxyacetone (100 vol %) | $LiPF_6$ (1.1 mol/L) | 17.5 |
| Ex. 2 | Methoxyacetone (100 vol %) | $LiPF_6$ (0.7 mol/L) | 15.9 |
| Ex. 3 | Methoxyacetone (100 vol %) | $LiPF_6$ (1.5 mol/L) | 16.7 |
| Ex. 4 | Methoxyacetone (100 vol %) | $LiPF_6$ (2.0 mol/L) | 13.4 |
| Ex. 5 | Methoxyacetone (70 vol %) + EC (30 vol %) | $LiPF_6$ (1.1 mol/L) | 16.0 |
| Ex. 6 | Methoxyacetone (50 vol %) + EC (50 vol %) | $LiPF_6$ (1.1 mol/L) | 14.6 |
| Ex. 7 | Methoxyacetone (20 vol %) + EC (80 vol %) | $LiPF_6$ (1.1 mol/L) | 11.3 |
| Ex. 8 | Methoxyacetone (70 vol %) + DMC (30 vol %) | $LiPF_6$ (1.1 mol/L) | 16.8 |
| Ex. 9 | Methoxyacetone (50 vol %) + DMC (50 vol %) | $LiPF_6$ (1.1 mol/L) | 15.2 |
| Ex. 10 | Methoxyacetone (20 vol %) + DMC (80 vol %) | $LiPF_6$ (1.1 mol/L) | 11.2 |

<Results>

In Comparative Example 1, a cyclic carbonate (EC) alone was used as solvent. In Comparative Example 1, conductivity was low. The reason is considered to be that the solvent had a high viscosity.

In Comparative Example 2, a chain carbonate (DMC) alone was used as solvent. In Comparative Example 2, conductivity was low as well. The reason is considered to be that the solvent had a poor dissociation-promoting ability.

In Comparative Example 3, a mixed solvent of a cyclic carbonate and a chain carbonate was used. The mixed solvent used in Comparative Example 3 is a solvent that is conventionally and widely used. In Comparative Example 3, compared to Comparative Examples 1 and 2, conductivity was high. The reason is considered to be that the use of the mixture of a cyclic carbonate and a chain carbonate resulted in an improved balance between dissociation-promoting ability and viscosity. It is considered that the mixing ratio in Comparative Example 3 is equivalent to a mixing ratio of a mixed solvent of EC and DMC at which a substantially maximum conductivity is obtained.

In Examples 1 to 9, methoxyacetone was used as solvent. Methoxyacetone is represented by the formula (I) below. The results from Example 1 and Comparative Example 3 suggest that methoxyacetone itself, compared to a mixed solvent of EC and DMC with an optimum mixing ratio, has dissociation-promoting ability and viscosity in an excellent balance.

In Comparative Examples 4 and 5, acetylacetone was used as solvent. Acetylacetone is represented by the formula (II) below. In Comparative Examples 6 and 7, methyl methoxyacetate was used as solvent. Methyl methoxyacetate is represented by the formula (III) below.

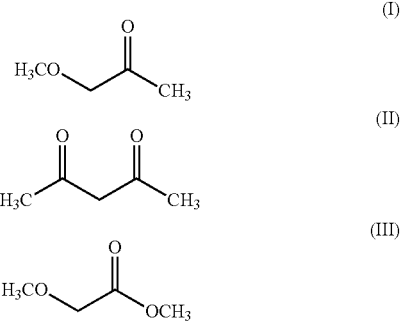

Methoxyacetone [formula (I) above], acetylacetone [formula (II) above], and methyl methoxyacetate [formula (III) above] have similar molecular weights and similar structures. However, a remarkably high conductivity was only obtained when the solvent contained methoxyacetone, as shown in the results from Example 1, Comparative Examples 4 and 6, and the like.

The viscosity of each of methoxyacetone, acetylacetone, and methyl methoxyacetate at 25° C. is described below. It is considered that there is no substantial difference in viscosity between these solvents. Therefore, the reason for the remarkably high conductivity obtained with methoxyacetone is considered to be as follows: methoxyacetone has a remarkably high dissociation-promoting ability compared to the dissociation-promoting ability of either acetylacetone or methyl methoxyacetate.

Methoxyacetone: 0.83 mPa·s
Acetylacetone: 0.75 mPa·s
Methyl methoxyacetate: 1.01 mPa·s The results obtained in Examples 1, 5 to 7, 8, and 9 show a tendency that the higher the volume ratio of methoxyacetone is, the greater the improvement in conductivity is. It is therefore considered that the solvent may contain methoxyacetone in an amount not lower than 50 vol %. It is also considered that the solvent may contain methoxyacetone in an amount not lower than 70 vol %. It is also considered that the solvent may consist of methoxyacetone.

The results obtained in Examples 1 to 4 show a tendency that the conductivity improves when the concentration of the Li salt is within the range from 0.7 mol/L to 1.5 mol/L. These results also show a tendency that the conductivity improves when the concentration of the Li salt is within the range from 1.1 mol/L to 1.5 mol/L.

The embodiments and examples disclosed herein are illustrative and non-restrictive in any respect. The technical scope indicated by the claims is intended to include any modifications within the scope and meaning equivalent to the terms of the claims.

What is claimed is:

1. An electrolyte solution for a lithium-ion battery, the electrolyte solution comprising at least:
   a solvent; and
   a lithium salt,
   the solvent comprising at least methoxyacetone.

2. The electrolyte solution according to claim 1, wherein the solvent comprises methoxyacetone in an amount not lower than 50 vol %.

3. The electrolyte solution according to claim 2, wherein the solvent comprises methoxyacetone in an amount not lower than 70 vol %.

4. The electrolyte solution according to claim 3, wherein the solvent consists of methoxyacetone.

5. The electrolyte solution according to claim 1, wherein the concentration of the lithium salt is not lower than 0.7 mol/L and not higher than 1.5 mol/L.

6. The electrolyte solution according to claim 5, wherein the concentration of the lithium salt is not lower than 1.1 mol/L and not higher than 1.5 mol/L.

7. A lithium-ion battery comprising at least the electrolyte solution according to claim 1.

* * * * *